United States Patent [19]
Johnson

[11] 4,348,361

[45] Sep. 7, 1982

[54] CARBON BLACK RECOVERY

[75] Inventor: Paul H. Johnson, Bartlesville, Okla.

[73] Assignee: Phillips Petroleum Company, Bartlesville, Okla.

[21] Appl. No.: 264,308

[22] Filed: May 18, 1981

Related U.S. Application Data

[62] Division of Ser. No. 44,147, May 31, 1979, Pat. No. 4,289,742.

[51] Int. Cl.³ .......................... C01B 31/02; C09C 1/48
[52] U.S. Cl. .................................... 422/150; 422/151; 422/156; 55/302
[58] Field of Search .............................. 422/150–157; 55/96–98, 293, 302; 423/450

[56] References Cited

U.S. PATENT DOCUMENTS

| | | | |
|---|---|---|---|
| 3,075,829 | 1/1963 | Latham, Jr. et al. | 23/209.4 |
| 3,410,055 | 11/1968 | Zenz | 55/293 |
| 3,926,593 | 12/1975 | Squires et al. | 55/96 |
| 4,237,092 | 12/1980 | Lewis | 422/150 |

*Primary Examiner*—Michael S. Marcus

[57] ABSTRACT

A process and apparatus for recovering carbon black from hot smoke which comprises passing the smoke through a cyclone separation zone following cooling, then through aggregate filter beds and regeneration of filter beds with clean off-gas which is recycled to the carbon black reaction zone as quench.

4 Claims, 1 Drawing Figure

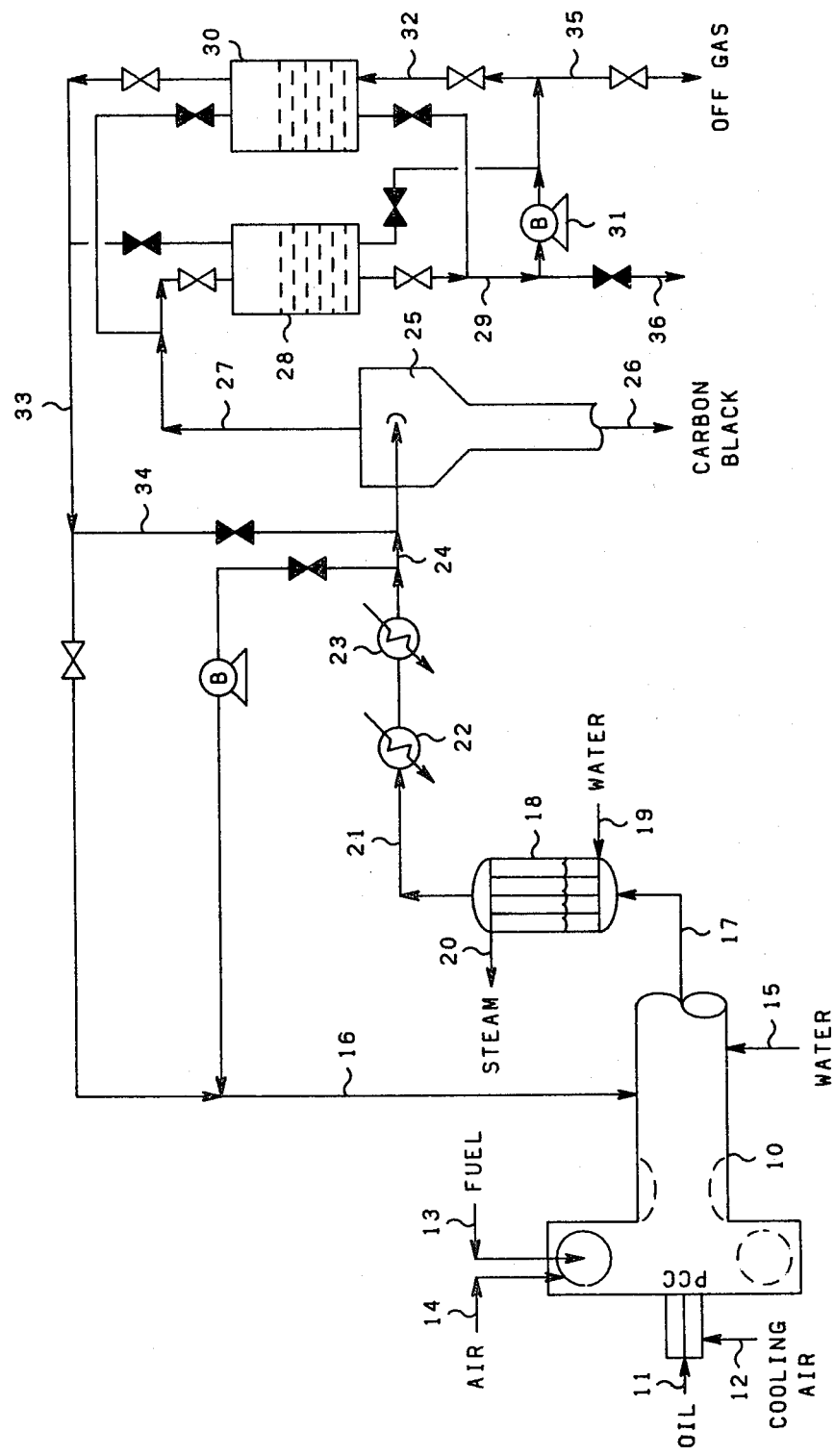

CARBON BLACK RECOVERY

This application is a division of my copending application having Ser. No. 044,147, filed May 31, 1979, now U.S. Pat. No. 4,289,742.

This invention relates to the recovery of particulate carbon black from carbon black smoke. In accordance with one aspect, this invention relates to a process of filtering a carbon black smoke stream containing carbon black particles. Still more specifically in a further aspect, this invention relates to filtering carbon black containing smoke and regeneration of the filters with clean off-gas and recycle of the regeneration gas to the carbon black producing furnace as quench. In accordance with a more specific aspect, this invention relates to a carbon black recovery process using cyclones and aggregate filter beds to recover carbon black from carbon black containing smoke. Further, this invention relates to the filtering apparatus for carrying out the filtering process of the invention.

In commercial carbon black production by the furnace black process, the effluent gas from a series of carbon black furnaces is passed through collecting system including various gas solid separators and filters. In every recovery or collection system various problems are confronted with respect to obtaining substantially complete removal of desired carbon black and yet yielding substantially clean off-gas from the system. The present invention is directed to a method and apparatus for the removal of carbon black from hot carbon black smoke in a combination of separations comprising cyclone separators and aggregate filter beds and use of off-gas (clean) for backflushing the aggregate filters to remove deposited carbon black and return as quench to the carbon black furnace.

Accordingly, an object of this invention is to provide a new filtering process.

Another object of this invention is to provide a new process for removing the solid particles from a carbon black containing gas stream.

Still another object of this invention is to provide a filtering process for filtering carbon black from carbon black containing gas streams and regeneration of the filtering equipment.

A further object of this invention is to provide a recycle quench stream for quenching hot carbon black smoke.

Other objects, aspects, and the several advantages of this invention will become apparent to those skilled in the art upon a study of the specification and appended claims.

In accordance with this invention, a process for recovering carbon black from a hot carbon black smoke stream is provided which comprises cooling the hot carbon black smoke stream by direct and by indirect heat exchange, subjecting the cooled carbon black smoke to cyclone separation to remove a substantial portion of the carbon black, passing gas removed from the cyclone separator through an aggregate filter bed to remove residual carbon black from the gas and regeneration of the aggregate filter bed with clean off-gas which is then recycled to the carbon black reactor as a quench stream. In current operations, the off-gas is passed through bag filters for the final cleaning. However, in accordance with the invention, the filter bag operation can be eliminated and a cyclone-aggregate bed filter system can be used instead.

A more complete understanding of the invention can be had by reference to the accompanying schematic drawing which is a flow diagram of a preferred embodiment of the invention.

Referring now to the drawing, the numeral 10 represents a series of reactors or furnaces producing carbon black according to conventional well-known furnace black processes as in U.S. Pat. No. 2,564,700, Joseph C. Krejci, issued Aug. 21, 1951. Feed or make oil is charged axially through line 11 to carbon black reactor 10 and nozzle cooling air is added by line 12 around the oil injection in line 11. The feed or make oil can be an aromatic oil of, for example, BMCI (Bureau of Mines Correlation Index) of 120 and a mid-boiling point of about 650°–700° F. such as a solvent extracted aromatic oil from a heavy cycle oil produced from a catalytic cracking of a virgin gas oil or a topped or reduced crude oil.

Tangential hot combustion gases are produced from burning a fuel, for example, a fuel gas introduced by line 13 of 940 Btu/standard cubic feet with combustion and excess air introduced by way of line 14. The mass reacts to produce carbon black contained in gases between the combustion or precombustion zone or chamber (PCC) and downstream of the reaction zone 10. A venturi can be used at the inlet of so-called reaction zone or chamber 10. The reaction for pyrolizing the oil 11 into carbon black occurs above 2400° F., usually above 2600° F. to 2900° F., depending on the type of carbon black desired to be produced.

The hot carbon black smoke produced within carbon black reactor 10 is quenched near the outlet end in order to reduce the temperature of the smoke prior to separation of carbon black particles. A quench fluid, such as water in line 15 and/or recycled cool gas in line 16, for example, at 400°–450° F., reduces the reactor effluent from carbon black smoke to below 2200° F., preferably to about 2000° F. The water 15 can be introduced at a temperature of about 100° F. The amount of quench fluid used will be sufficient to lower the carbon black smoke temperature to the desired level. It is desirable to quench the carbon black furnace effluent to a temperature of about 2000° F., or even below that temperature, since the carbon black formation reaction is substantially stopped although structure and photelometer can be altered even below temperatures of about 2000° F.

The quenched reactor effluent removed by line 17 is passed through the tube side of a shell-tube heat exchanger 18. High pressure preheated water, for example 600 psia and about 485° F., introduced by line 19 is removed as high pressure steam from the shell-side of exchanger 18 by line 20. The effluent removed from exchanger 18 by line 21 is at about 1200° F. and is further indirectly cooled in indirect heat exchangers 22 and 23. Exchanger 22 is conveniently used to preheat air 14 and exchanger 23 can be conveniently used to preheat the feed oil 11. The effluent from exchanger 23 is passed by way of line 24 at about 700° F., for example, to cyclone separator 25 from which a major portion of the carbon black (loose or flocculent black) is recovered by line 26 and can be passed to further processing which is wet pelleting and drying (not shown).

Although only one cyclone separator 25 is shown in the drawing, it should be recognized that a series of cyclone separators can be used. The suspension of carbon black in line 24 is passed through the cyclone separators under conditions such that a substantial portion of the carbon black is removed by line 26. Effluent gas containing a minor amount of carbon black is passed through line 27 through a series of aggregate bed filters 28. Clean effluent off-gas is removed from filter beds 28 by line 29. In a preferred embodiment, filter 28 can contain sand or gravel or other suitable aggregate filtering mediums. Filter 28 is a fixed bed of aggregate which filters out the remaining carbon black from the gases and is one of several units on the filtration cycle. Filtration zone 30 is on the carbon black removal cycle or regeneration cycle. This unit is operated as a fluidized fixed bed of aggregate, using a portion of the clean off-gas or carbon black free off-gas 29 from filtering unit 28 to remove the carbon black from filter bed 30. The clean off-gas is passed through blower 31 to increase the pressure for passing the clean off-gas through line 32 into the base of filter bed 30. The removed carbon black in the regeneration gas removed from filter bed 30 on regeneration cycle is passed by way of line 33 and line 16 and passed as part of the quench fluid through the carbon black reactor 10. If desired, a portion of the regeneration gas containing carbon black in line 33 can be passed by way of line 34 to cyclone separator 25.

Clean off-gas can be removed from the system at either line 35 or line 36 which would be upstream of blower 31.

Although only a single filter bed 28 is shown on the filtering cycle and a single bed 30 on regeneration, it should be understood that multiple beds can be in operation in a continuous cycle wherein most of the beds are on the filtering cycle and one or more are on a cleaning regeneration cycle. Suitable conduit manifolding will be provided along with the appropriate valving so that there will be continuous operation of units on a filtering cycle and one or more on regeneration cycle.

In order to still more fully explain the invention, typical calculated operating data are given in the following tabular example. The illustrative calculated example, for simplicity of illustration of the invention, returns the carbon black containing gas 33 removed from the filtering bed being regenerated via the quench 16 ultimately yielding out by way of line 26.

| CALCULATED EXAMPLE | | |
|---|---|---|
| Carbon Black Reactor 10: | | |
| 11 | Make Oil, G/H | 360 |
| | Temp., °F. | 500 |
| | BMCI | 124 |
| | Boiling Ranger, °F. | 600 to 1,200 |
| 12 | Nozzle Cooling Air, SCF/H | 6,000 |
| 13 | Fuel (Gas, 940 Btu/SCF), SCF/H | 12,200 |
| 14 | Tangential Air, SCF/H | 220,000 |
| | Temp., °F. | 900 |
| 16 | Quench Gas, SCF/H | 129,000 |
| | Temp., °F. | 400 |
| | LBS Carbon Black/1000 SCF | 5.2 |
| 17 | Quenched Effluent, SCF/H | 439,000 |
| | Temp., °F. | 2,000 |
| 24 | Final Effluent, SCF/H | 439,000 |
| | Temp., °F. | 700 |
| 26 | Carbon Black, Lbs/hr. | 1,575 |
| | Typical N220 | |
| 27 | Gas to Filter 28, SCF/H | 439,000 |
| | Lbs Carbon/1000 SCF | 5.06 |
| | Temp., °F. | 600 |
| 29 | Cleaned Off-Gas, SCF/H | 439,000 |
| | Lbs Carbon/1000 SCF | Nil |
| | Pressure, psig | 0.5 |
| 35 | Off-Gas Yield, SCF/HR | 310,000 |
| | Pressure, psig | 6 |
| | Temp., °F. | 450 |
| 32 | Regeneration Gas, SCF/HR | 129,000 |
| | Pressure, psig | 5 |

| -continued | | |
|---|---|---|
| CALCULATED EXAMPLE | | |
| | Temp., °F. | 450 |
| Units 28 and 30*: | | |
| Gravel (sand, mostly silica) - (composition of material) | | |
| | (a) Size Range | 10 to 16 U.S. Std. Mesh |
| | (b) Pounds of Gravel/1000 SCF of Gas/Hr | 9 to 20 |
| | (c) Bed Size | |
| | Diameter, Ft. | 2.5 |
| | Height, Ft. | 0.5 |
| 28 | Time on Filter Cycle, Min. | 18.5 to 74 |
| 30 | Time on Cleanup, Min. | 0.5 to 2 |

*(38 units like 28 or 30; on filter, one being cleaned)

The filter aggregate which can be used will preferably range from about 10 to about 16 U.S. Standard Mesh size. The aggregate can be comprised of silica, alumina, magnesium hydroxide, calcium sulfate, silica-alumina, and the like materials which are relatively inert to the carbon black quenched reactor effluent. The loose or bulk density of the aggregate will range from about 75 to 125 pounds per cubic foot.

I claim:

1. A carbon black producing and recovery system comprising in combination
    (a) a carbon black producing furnace having a hot smoke outlet connected to the inlet of a waste heat boiler;
    (b) an indirect heat exchange apparatus connected to the outlet of said waste heat boiler and the inlet of a cyclone separator provided with an outlet in the lower portion for removal of separated carbon black product and an outlet in the upper portion for removal of carbon black smoke reduced in carbon black content;
    (c) at least two filter chambers, each containing a bed of aggregate material, at least one of said chambers being on filtration cycle and connected at the inlet end to said outlet in the upper portion of said cyclone for removal of remaining carbon black in said smoke being passed therethrough and at least one of said chambers being on regeneration cycle;
    (d) an outlet in each filter chamber for removal of clean off-gas;
    (e) a valved conduit connecting said outlet in (d) with the outlet end of said at least one filter chamber having a bed of aggregate containing carbon black solids which is on regeneration cycle and closed to the filtering cycle;
    (f) means in said valved conduit of (e) for increasing the pressure of said off-gas and forcing same through said filter chamber(s) on regeneration cycle to substantially remove deposited carbon black solids remaining from a filtering cycle and removing same through the inlet end of said filter chamber being regenerated; and
    (g) valved conduit means connecting the inlet end of said filter chamber being regenerated in (f) and said furnace in (a) to quench carbon black smoke within said furnace.

2. An apparatus according to claim 1 wherein the heat exchange in (b) comprises two heat exchangers in series connected between said waste heat boiler and said cyclone separator and further wherein the first is connected with air which is passed in indirect heat exchange with the smoke through the heat exchanger and the second heat exchanger is connected to hydrocarbon oil for heat exchange with the carbon black smoke.

3. An apparatus according to claim 1 wherein the valved conduit in (g) connecting the filter chamber being regenerated and the furnace is connected to a conduit in open communication with the inlet to the cyclone separator.

4. An apparatus according to claim 1 wherein the filter chambers and conduit and manifolding connecting the inlets and outlets of said chambers are so arranged that operation is continuous with most chambers on filtration cycle and at least one on regeneration with the proviso that the clean off-gas recovered from the filtration cycle is used as regeneration gas to clean filters being regenerated and regeneration gas removed therefrom is recycled through said valved conduit means (g) to the carbon black producing furnace as quench.

* * * * *